United States Patent [19]
Remp

[11] Patent Number: 6,116,751
[45] Date of Patent: Sep. 12, 2000

[54] LIGHTED LANDSCAPING STONE

[76] Inventor: Troy Remp, 111 State St., Shillington, Pa. 19607

[21] Appl. No.: 09/292,533

[22] Filed: Apr. 15, 1999

[51] Int. Cl.[7] .................................................. F21S 8/00
[52] U.S. Cl. ...................... 362/153; 362/153.1; 362/565; 362/252; 362/249; 362/806; 362/559; 362/431
[58] Field of Search ................................ 362/153, 153.1, 362/145, 565, 576, 249, 252, 806, 559, 431, 263

[56] References Cited

U.S. PATENT DOCUMENTS

| | | | |
|---|---|---|---|
| 4,697,950 | 10/1987 | Copeland | 404/9 |
| 4,992,914 | 2/1991 | Heiss et al. | 362/153.1 |
| 5,065,291 | 11/1991 | Frost et al. | 362/183 |
| 5,160,202 | 11/1992 | Légaré | 362/153.1 |
| 5,390,090 | 2/1995 | Nau | 362/153 |
| 5,678,920 | 10/1997 | Kerr | 362/145 |
| 5,806,263 | 9/1998 | Coleman | 52/306 |
| 5,984,570 | 11/1999 | Parashar | 404/14 |

*Primary Examiner*—Sandra O'Shea
*Assistant Examiner*—Ronald E. DelGizzi
*Attorney, Agent, or Firm*—Henderson & Sturm LLP

[57] ABSTRACT

A lighted landscaping stone including a body member having an upper translucent panel, a lower reflective panel, and sidewalls connecting the upper and lower panels to form an internal cavity. Hourglass-shaped support columns extend between the upper and lower panels and are aligned in a criss-cross pattern to provide maximum support. An elongated light emitting member is arranged within the cavity in a serpentine pattern around the support columns to provide uniform lighting to the entire area of upper panel. The elongated light emitting member is preferably a fiber optic line.

15 Claims, 2 Drawing Sheets

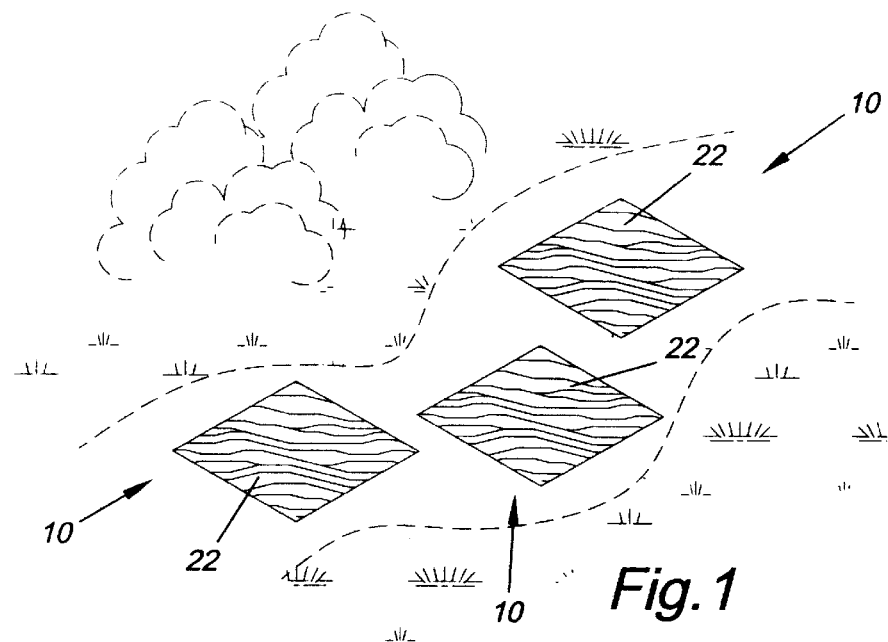
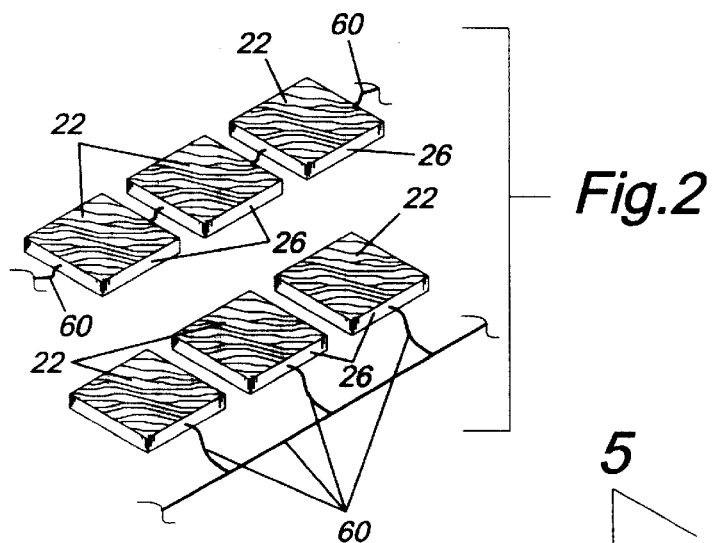
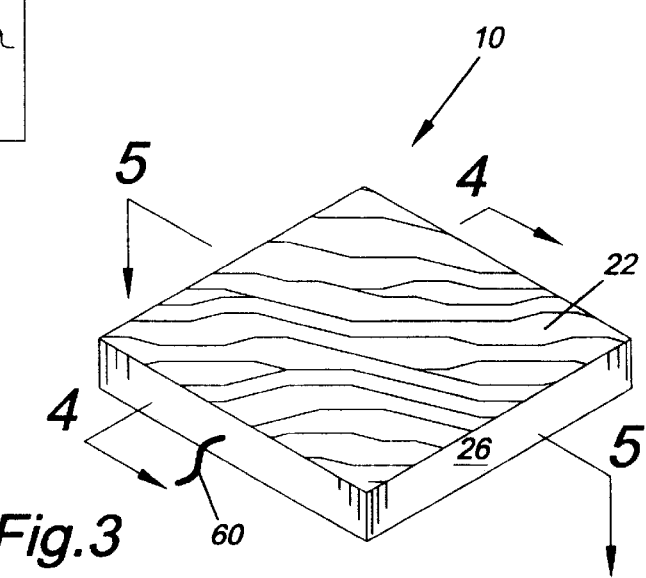

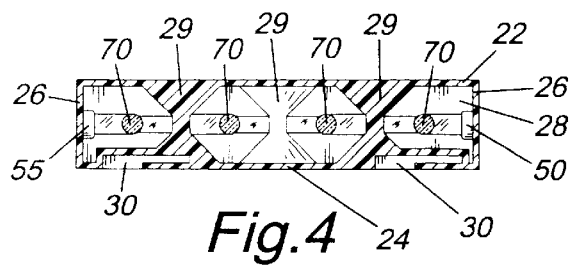
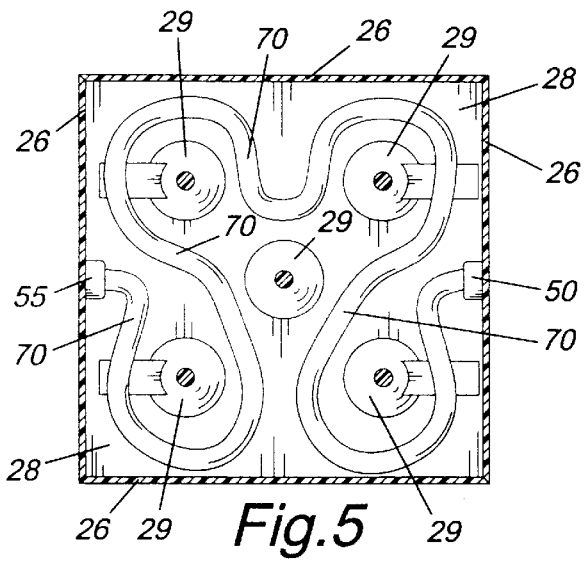
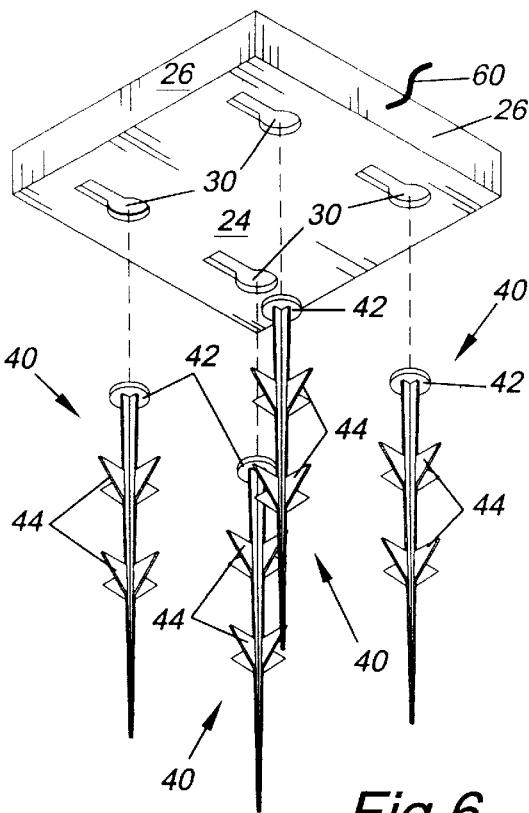
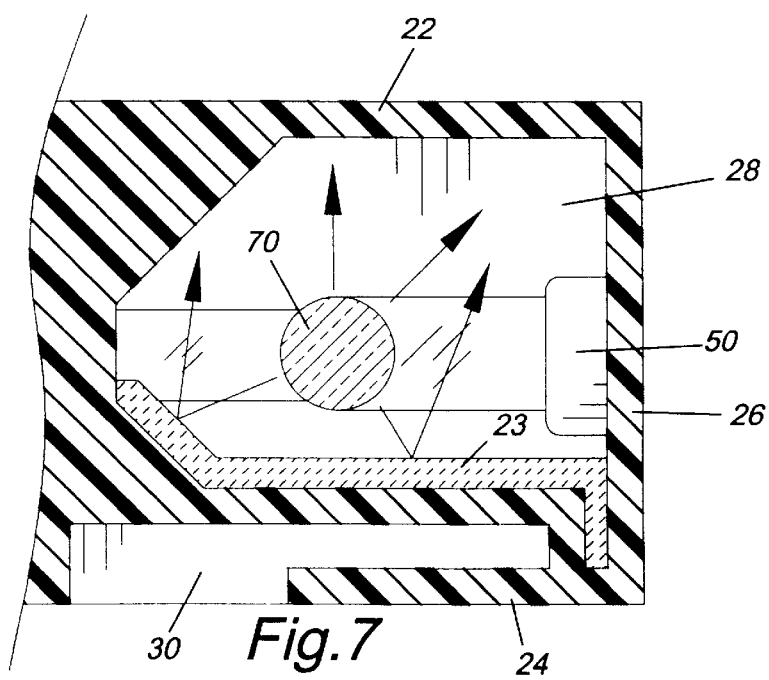

LIGHTED LANDSCAPING STONE

BACKGROUND OF THE INVENTION

1. Field of the Invention

The present invention relates to the field of landscaping accessories, and more particularly to a lighted landscaping stone.

2. Description of Related Art

As can be seen by reference to the following U.S. Pat. Nos. 4,697,950; 4,992,914; 5,160,202; 5,390,090; and 5,678,920, the prior art is replete with myriad and diverse lighted landscaping accessories.

While all of the aforementioned prior art constructions are more than adequate for the basic purpose and function for which they have been specifically designed, they are uniformly deficient with respect to their failure to provide a simple, efficient, and practical uniformly lit landscaping stone.

As a consequence of the foregoing situation, there has existed a longstanding need for a new and improved type of lighted landscaping stone, and the provision of such a construction is a stated objective of the present invention.

BRIEF SUMMARY OF THE INVENTION

Briefly stated, the present invention provides a lighted landscaping stone including a body member having an upper translucent panel, a lower reflective panel, and sidewalls connecting the upper and lower panels to form an internal cavity. Hourglass-shaped support columns extend between the upper and lower panels and are aligned in a crisscross pattern to provide maximum support. An elongated light emitting member is arranged within the cavity in a serpentine pattern around the support columns to provide uniform lighting to the entire area of upper panel. The elongated light emitting member is preferably a fiber optic line.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view illustrating three lighted landscaping stones of the present invention arranged along a pathway;

FIG. 2 is a top perspective view illustrating three landscaping stones connected in series and three landscaping stones connected in parallel by cable;

FIG. 3 is a top perspective view of a landscaping stone of the present invention;

FIG. 4 is a side elevation sectional view taken along line 4—4 of FIG. 3 showing the internal hourglass shaped support columns;

FIG. 5 is a top plan sectional view taken along line 5—5 of FIG. 3 showing the serpentine pattern of the light emitting member;

FIG. 6 is a bottom exploded perspective view illustrating the attachment of the anchor spikes to the lower panel of the body member; and FIG. 7 is a greatly enlarged partial perspective view illustrating the reflective top face and the slotted bottom face of the lower panel of the body member.

DETAILED DESCRIPTION OF THE INVENTION

As can be seen by reference to the drawings, and in particular to FIG. 1, the lighted landscaping stone that forms the basis of the present invention is designated generally by the reference number 10. The stones 10 are shown arranged along a pathway and are recessed in the soil as is conventional with other landscaping stones. FIG. 2 illustrates that the lighted stones 10 may be connected either in series or in parallel.

As best shown in FIGS. 3–7, each of the stones 10 have a body member 20 including an upper translucent panel 22, a lower panel 24, sidewalls 26 all connected to form an internal cavity 28. Within the cavity 28, a number of hourglass-shaped support columns 29 are arranged in a criss-cross pattern. The lower panel 24 has a reflective top face 23 and a bottom face that carries a number of key-shaped slots 30. Anchor spikes 40 have enlarged heads 42 that are received in the circular portion of the slots 30, and barbs 44 that secure the spikes 40 in position in the soil.

Each stone 10 has an inlet connector 50 and an outlet connector 55 that extends through the sidewalls 26 for connection to an energy cable 60. An elongated light emitting member 70 is disposed within the cavity 28 between the inlet and outlet connectors 50, 55. The cable 60 supplies light energy to the light emitting member 70 when it is a fiber optic line, and supplies electrical energy to the member 70 when it is a rope lighting line. The light emitting member 70 is arranged in a serpentine pattern around the columns 29 so that the entire area of the upper panel 22 is evenly illuminated.

The main features of the stones 10 are that they are lightweight, but durable imitation stone units that have a novel effect of illumination. In addition, these stepping stones 10 can replace some traditional landscape lighting devices. These stones 10 lay flat on the ground and do not stick up into the air as do many landscape related lighting fixtures. The stones 10 will not be damaged by snow removal, grass cutting, landscaping activities and other typical causes of damage to aboveground landscape lighting. This landscape lighting and stepping stone system not only provides visual safety, but it also provides a flat surface on which to walk. Also, the stones 10 are easy to install. A user simply forces the spikes 40 into the ground and connects each stone 10 with cable 60 to the next stone 10. Securing the stones 10 by using the spikes 40 helps prevent the stones from coming loose, or from floating away during heavy rains or as a result of melting snow.

The preferred method for illuminating the stones 10 is fiber optics. Fiber optic lighting systems provide illumination over a given area with only a single halogen or HID light source required to power all or part of a particular fiber optic installation. Fiber optics can readily supplant multiple electrical light sources that usually add up to greater wattage. The illuminator can also be located remotely at or near floor level, convenient to maintenance checks and for eventual lamp replacement of that single source. The only electrical connection needed for a fiber optic lighting installation is at the illuminator. No wiring and no electrical connection is needed along a given length of fiber optic cable or at a fiber optic point source fixture.

A type of fiber cable known as BritePak provides fiber optic strands grouped into densely packed bundles that are twisted and drawn through a PVC outer jacket. This is a classic example of the sum being greater than the parts. Twisting noticeably heightens the amount of illumination released along the cable length. When fiber optics are used in linear or accent lighting applications, the cable length achieves very even output along a greater distance than ever before.

Fiber optic strands used for lighting are closely related to the plastic or glass fiber strands used to carry pulses of laser light from a transmitter to a receiving end in a telecommunications circuit. Fiber optic lighting has been most often applied for linear side emitting applications, along the length of fiber optic tubing, and often as a more cost effective, trouble free substitute for neo.

Most optical fibers used for commercial lighting applications in the United States have a core material of plastic with a high refractive index and a cladding with a lower refractive index. Light rays generated from the illuminator are transmitted along the core material totally by internal reflection at the core/cladding boundary. These light rays travel through standard bends and are evenly emitted outward along the entire specified length of fiber optic cable.

Rope lighting is a standard industry system of lighting used in a variety of indoor and outdoor uses. Rope lighting is a series parallel arrangement of bulbs at one inch intervals, coated with a flexible PVC layer approximately ⅜" or ½" in diameter of a ⅜" by ¾" flat configuration. The PVC layer permanently protects the bulbs and wiring, allowing both indoor and outdoor applications. Applications include: landscaping, running boards, mood lighting, below counter lighting, patio/deck lighting, holiday decorating or just about anywhere glowing, indirect lighting is desirable. Colors may be combined to make multi-colored lighting "rope". Custom signage or window bordering can be easily fabricated and self installed with mounting hardware, duplicating virtually anything made with traditional glass neon lighting—it is also non-breakable, non-toxic and reusable.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A lighted landscaping stone, comprising:

a body member including an upper translucent panel, a lower panel having a reflective top face, and sidewalls interconnecting the upper and lower panels to define an internal cavity;

hourglass shaped support columns disposed in the cavity and extending between the upper and lower panels, the columns being aligned within the cavity in a crisscross pattern;

an inlet connector disposed through the sidewall;

an outlet connector disposed through the sidewall;

an elongated light emitting member disposed within the cavity in a serpentine pattern around the columns and being operably connected to and extending between the inlet and outlet connectors; and cable operably attached between an energy source and the light emitting member.

2. The lighting landscaping stone of claim 1 wherein the lower panel includes a bottom face having a plurality of slots formed therein; and further including a plurality of anchor spikes, each spike being adapted to connect to and extend down from one of the slots.

3. The lighting landscaping stone of claim 2 wherein the spikes are barbed to secure them into soil.

4. The lighting landscaping stone of claim 1 wherein the light emitting member is a fiber optic line.

5. The lighting landscaping stone of claim 2 wherein the light emitting member is a fiber optic line.

6. The lighting landscaping stone of claim 3 wherein the light emitting member is a fiber optic line.

7. The lighting landscaping stone of claim 1 wherein the light emitting member is a rope lighting line.

8. The lighting landscaping stone of claim 2 wherein the light emitting member is a rope lighting line.

9. The lighting landscaping stone of claim 3 wherein the light emitting member is a rope lighting line.

10. The lighting landscaping stone of claim 1 wherein a plurality of stones are connected in series by the cable.

11. The lighting landscaping stone of claim 1 wherein a plurality of stones are connected in parallel by the cable.

12. The lighting landscaping stone of claim 4 wherein a plurality of stones are connected in series by the cable.

13. The lighting landscaping stone of claim 4 wherein a plurality of stones are connected in parallel by the cable.

14. The lighting landscaping stone of claim 7 wherein a plurality of stones are connected in series by the cable.

15. The lighting landscaping stone of claim 7 wherein a plurality of stones are connected in parallel by the cable.

* * * * *